(12) United States Patent
Farinelli

(10) Patent No.: US 7,212,204 B2
(45) Date of Patent: May 1, 2007

(54) SYSTEM AND METHOD FOR GRAPHICS CULLING

(75) Inventor: Paolo Farinelli, Rome (IT)

(73) Assignee: Silicon Graphics, Inc., Mountain View, CA (US)

( * ) Notice: Subject to any disclaimer, the term of this patent is extended or adjusted under 35 U.S.C. 154(b) by 317 days.

(21) Appl. No.: 11/043,038

(22) Filed: Jan. 27, 2005

(65) Prior Publication Data

US 2006/0164414 A1  Jul. 27, 2006

(51) Int. Cl.
*G06T 15/40* (2006.01)

(52) U.S. Cl. ............... 345/421; 345/582; 345/622; 345/502

(58) Field of Classification Search ......... 345/421, 345/622

See application file for complete search history.

(56) References Cited

U.S. PATENT DOCUMENTS

| | | | | |
|---|---|---|---|---|
| 5,990,904 | A * | 11/1999 | Griffin | 345/631 |
| 6,646,639 | B1 * | 11/2003 | Greene et al. | 345/422 |
| 7,023,437 | B1 * | 4/2006 | Voorhies et al. | 345/420 |
| 2003/0052821 | A1 * | 3/2003 | Holt | 342/453 |
| 2004/0012603 | A1 * | 1/2004 | Pfister et al. | 345/582 |
| 2004/0080512 | A1 * | 4/2004 | McCormack et al. | 345/543 |
| 2005/0002662 | A1 * | 1/2005 | Arpa et al. | 396/120 |
| 2005/0088450 | A1 * | 4/2005 | Chalfin et al. | 345/552 |
| 2005/0104898 | A1 * | 5/2005 | Moffitt et al. | 345/622 |
| 2005/0225670 | A1 * | 10/2005 | Wexler et al. | 348/441 |
| 2005/0237336 | A1 * | 10/2005 | Guhring et al. | 345/582 |
| 2006/0094500 | A1 * | 5/2006 | Dyke et al. | 463/30 |
| 2006/0197768 | A1 * | 9/2006 | Van Hook et al. | 345/546 |
| 2006/0232583 | A1 * | 10/2006 | Petrov et al. | 345/419 |

* cited by examiner

*Primary Examiner*—Mark Zimmerman
*Assistant Examiner*—Crystal Murdoch
(74) *Attorney, Agent, or Firm*—Sterne, Kessler, Goldstein & Fox PLLC

(57) ABSTRACT

A method is disclosed for culling an object database in a graphics processing system. In one embodiment, the method comprises encoding per-object parameters and culling parameters. The per-object parameters are encoded in texture format thereby creating at least one per-object texture containing the encoded per-object parameters. Next, a fragment program used in a fragment processor of the GPU is optionally updated. The updated fragment program embodies a culling operation. A polygon is then rendered, wherein the rendering step includes per-fragment operations. During the per-fragment operations, the updated fragment program is executed. The culling operation embodied therein (i) accesses the culling parameter, (ii) samples the per-object textures, and (iii) produces cull results for a set of database objects. In this fashion, the fragment processor in the GPU is leveraged to perform computationally intensive culling operations.

29 Claims, 3 Drawing Sheets

SYSTEM AND METHOD FOR GRAPHICS CULLING

BACKGROUND OF THE INVENTION

1. Field of the Invention

The present invention relates to computer graphics including culling operations using a graphics processing unit.

2. Background

A wide variety of applications rely on computer graphics to generate images. An image is made up of an array of picture elements (pixels) or fragments and can be displayed on a display unit, such as, a monitor, screen or cathode ray tube. Many different types of computing devices with graphics capabilities are used to generate images. Such computing devices use graphics processing. The computational workload in graphics processing systems is generally split between a central processing unit (CPU) and a graphics processing unit (GPU). A combination of software, firmware and/or hardware may be used to implement graphics processing. For example, graphics processing, including rendering can be carried out in a graphics card, graphics subsystem, graphics processor, graphics or rendering pipeline, and/or a graphics application programming interface (API), such as OpenGL.

In recent years, there has been a dramatic increase in the processing power of GPUs, which are now typically able to distribute rendering computations over a number of parallel hardware pipelines. This has led to the transition of several stages of the rendering pipeline from the CPU to one or more GPUs. For example, per-vertex transformations and lighting may now be done on a GPU. At the same time, GPUs have become more and more flexible, allowing user-provided code to be executed at certain stages of the traditional rendering pipeline. However, a number of operations related to the generation of three-dimensional images are still typically performed on the CPU, or on multiple CPUs, and have not yet transitioned onto the GPU. Examples of such operations include computations generically referred to as "culling." Culling operations are typically carried out in the CPU for each rendered frame, in order to determine which portions of the database are visible, and thus should be submitted to the GPU for rendering. Culling operations may also include further processing of visible portions of the database, including, for example, level of detail selection or billboard orientation computations.

Increasing demands are being made upon graphics processing. These demands include realism, speed and cost. Realistic images are desired to be rendered at real-time, interactive rates. Such requirements are computationally intensive. It is beneficial then, to make the most efficient use of the computational abilities in both the CPU and the GPU. The inventor has discovered a way to leverage GPUs to perform computationally intensive tasks, such as culling, thereby increasing the overall efficiency of the graphics processing. Any increases in efficiency can be directly translated to increased realism and speed, while also reducing cost.

BRIEF SUMMARY OF THE INVENTION

Additional features and advantages of the invention will be set forth in the description that follows, and in part will be apparent from the description, or may be learned by practice of the invention.

In one embodiment, a method for using a graphics processing unit (GPU) to cull an object database is disclosed. The method comprises encoding per-object parameters and culling parameters. The per-object parameters are encoded in texture format to create at least one per-object texture. Next, a fragment program used in a fragment processor of the GPU is optionally updated. The fragment program embodies a culling operation. A polygon is then rendered, wherein the rendering step includes per-fragment operations. During the per-fragment operations, the updated fragment program is executed. The culling operation embodied therein (i) accesses the culling parameter, (ii) samples the per-object texture, and (iii) produces cull results for a set of database objects. In this fashion, the fragment processor in the GPU is leveraged to perform computationally intensive culling operations, whereby the produced cull results will eliminate or reduce further processing of invisible, occluded, or distant objects.

In another embodiment, a system for using a GPU to cull an object database is disclosed. A graphics processing system for culling a geometry database comprises a per-object parameter encoder that encodes per-object parameters in texture format, thereby creating at least one per-object texture containing the encoded per-object parameters. The system also includes a culling parameter encoder that encodes at least one culling parameter. A rendering pipeline having a programmable fragment processor is used to render a polygon. The programmable fragment processor has access to both the texture encoded per-object parameters and the encoded culling parameters, and executes an optionally updated fragment program. The updated fragment program embodies a culling operation that (i) accesses the culling parameter, (ii) samples the per-object texture, and (iii) produces cull results for a set of database objects. In this fashion, the produced cull results will eliminate or reduce further processing of invisible, occluded, or distant objects.

It is to be understood that both the foregoing general description and the following detailed description are exemplary and explanatory and are intended to provide further explanation of the invention as claimed. Neither the Summary of the Invention nor the Detailed Description are intended to limit the scope of the invention beyond what is claimed.

BRIEF DESCRIPTION OF THE DRAWINGS/FIGURES

The present invention is described with reference to the accompanying figures. In the figures, like reference numbers indicate identical or functionally similar elements. Additionally, the leftmost digit of a reference number identifies the figure in which the reference number first appears. The accompanying figures, which are incorporated herein and form part of the specification, illustrate the present invention and, together with the description, further serve to explain the principles of the invention and to enable a person skilled in the relevant art to make and use the invention.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments that fall within the scope of the claims, and additional fields in which the invention would be of significant utility.

This invention relates to a system and method for leveraging certain functions of a rendering pipeline in a GPU to perform computationally intensive operations. In an embodiment, a fragment processor in the GPU is used to perform culling operations on an object database. In any image to be rendered and displayed, there will likely be objects or parts of objects that are not visible due to their position with respect to the camera, or viewpoint. Generically, the term "culling" refers to the process of eliminating such invisible objects to avoid redundant rendering. Culling may also refer to reducing processing requirements for visible objects by selecting, for instance, an appropriate level of detail in which to render an object based on the objects distance from the camera or viewpoint.

One of skill in the relevant art would recognize a variety of culling operations such as view frustum culling, occlusion culling, backface culling, level of detail (LOD) evaluations, and small feature culling. Such examples are described more fully below. Performing the computationally intensive culling operations in the GPU reduces the load on the CPU, thereby increasing overall graphics processing efficiency. Additionally, modern GPU's typically comprise multiple rendering pipelines. Multiple rendering pipelines allow such computations to be carried out in parallel, thereby improving both speed and accuracy of the culling operation.

Figure 1:
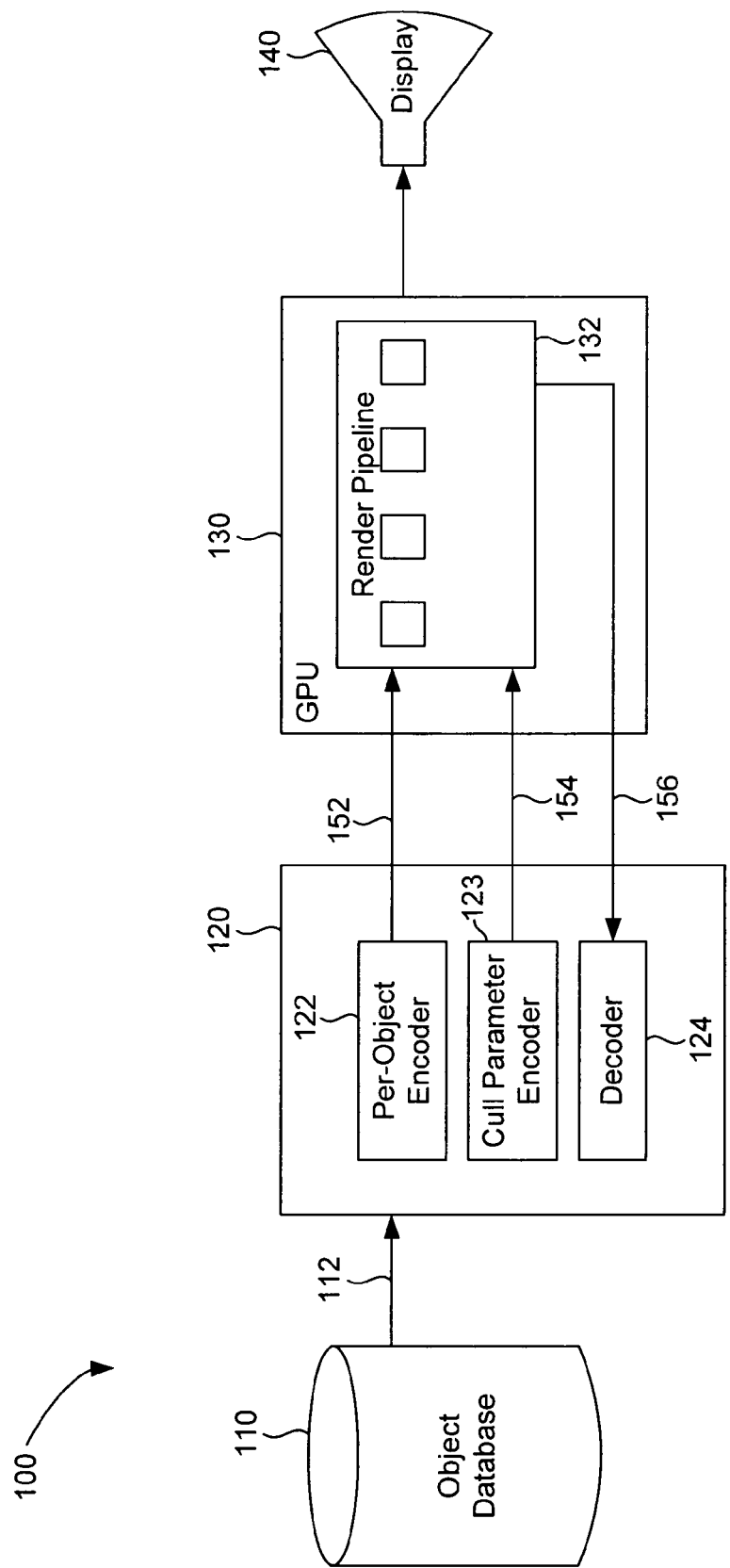
FIG. 1 illustrates a graphics processing system in which the present invention may operate.

FIG. 1 illustrates a graphic processing system in which an embodiment of the present invention may be implemented. The exemplary graphics processing system 100 comprises an object database 110, a CPU 120, a GPU 130, and a display 140. CPU 120 has the ability to manipulate and manage the different types of data typically used in graphics processing. For example, CPU 120 can manipulate and arrange the vertex data that makes up objects in the object database 110. More specifically, CPU 120 can encode graphics data so as to be readable by GPU 130. CPU 120 can also decode graphics data from GPU 130. The encoding function is represented by per-object encoder 122, and cull parameter encoder 123. The decoding function is represented by decoder 124.

It should be noted here that the term "object," as used in this specification, broadly refers to any entity in the object database. In the case of hierarchical culling, the term object may refer to any group of entities in the object database. While the invention is described below in the context of a simple culling operation, it is not so limited. The skilled artisan will recognize that the principles embodied below may be applied equally well to hierarchical culling operations.

Furthermore, it is important to note that FIG. 1 represents only one system in which the invention could be implemented. Other systems could be envisioned without departing from the scope of the claims. For instance, the encoding and decoding functions need not be confined to the CPU. The encoding and decoding operations could, for example, be implemented on the GPU itself, or in another separate location. Additionally, the object databases need not be confined to any particular location, and may even be co-located or cached on the CPU or even the GPU. Additional hardware components could also be included or implemented in the CPU or GPU in the form of, for example, an OpenGL extension that allows GPU culling to be performed on GPU cached geometry. Such geometry could also be stored or cached on the GPU for use in culling operations. Finally, multiple GPU's can be implemented in the system of FIG. 1. In a multiple GPU system, the invention may be carried on a single GPU, or in parallel on multiple GPU's. Thus, while the invention is described, for simplicity, as being implemented on a single GPU, the invention and claims are not intended to be so limited.

GPU 130 contains at least one rendering pipeline 132. While only one rendering pipeline is shown for simplicity, modern GPU's typically contain multiple rendering pipelines that act in parallel to process graphics data. Typically, the flow of graphics data begins in CPU 120, where object data 112 is imported from object database 110. However, a GPU could also directly access object database 110. Objects are typically in the form of vertices—i.e., points in three dimensional space that define the surface of the object. Other information may be stored in an object database, such as vetex normals, vertex colors, material properties and associated texture data. Only one object database 110, and one GPU 130 are shown for simplicity. The skilled artisan would recognize that the invention could be implemented on multiple databases and multiple GPU's. In an embodiment, CPU 120 encodes two different types of information for export to GPU 130.

First per object encoder 122 encodes a set of per-object parameters as textures. For example, and as described more fully below, a per-object parameter could be a bounding sphere that represents the size and position of an object, or group of objects, in object database 110. A texture is simply a one, two or three-dimensional image that is used to modify the color of fragments produced by rasterization in a rendering pipeline. The texture is typically a rectangular array of data and may be in various formats such as floating point format or integer format, or compressed variations thereof. What is important is that the format be usable by fragment processor 230 (described below) of rendering pipeline 132.

Second, cull parameter encoder 123 also encodes a culling parameter 154. Culling parameter 154 could be a single clip plane. Or, as described more fully below, multiple culling parameters could be encoded to represent, for example, a set of six planes representing a view frustum. As with the per-object parameters 152, the culling parameters 154 can be encoded in floating point format or integer format. The choice of encoded format is driven by the data format used in fragment processor 230 of rendering pipeline 132.

The per-object parameters 152 and culling parameters 154 are then exported to GPU 130. As noted above, the encoding and decoding operations need not be confined to CPU 110. They could be implemented on GPU 130, or in another separate location, without departing from the scope of the claims. GPU 130 is then used to carry out the culling operation. More specifically, and as explained more fully below, the culling operation is carried out by a fragment program running in fragment processor 230 of rendering pipeline 132. The culling operation produces cull results for a set of database objects. This data is optionally imported back into CPU 120 and decoded by decoder 124 to obtain the results of the culling operation in a form usable by CPU 120. Alternatively, the cull results could be stored for further use in GPU 130.

The preceding paragraphs illustrate one embodiment of a system in which the present invention may be carried out. One of skill in the art could envision other systems without departing from the scope of the claims. Additionally, for simplicity, numerous other obvious connections between the CPU and GPU have not been illustrated or described. The following paragraphs illustrate in more detail rendering pipeline 132.

Figure 2:
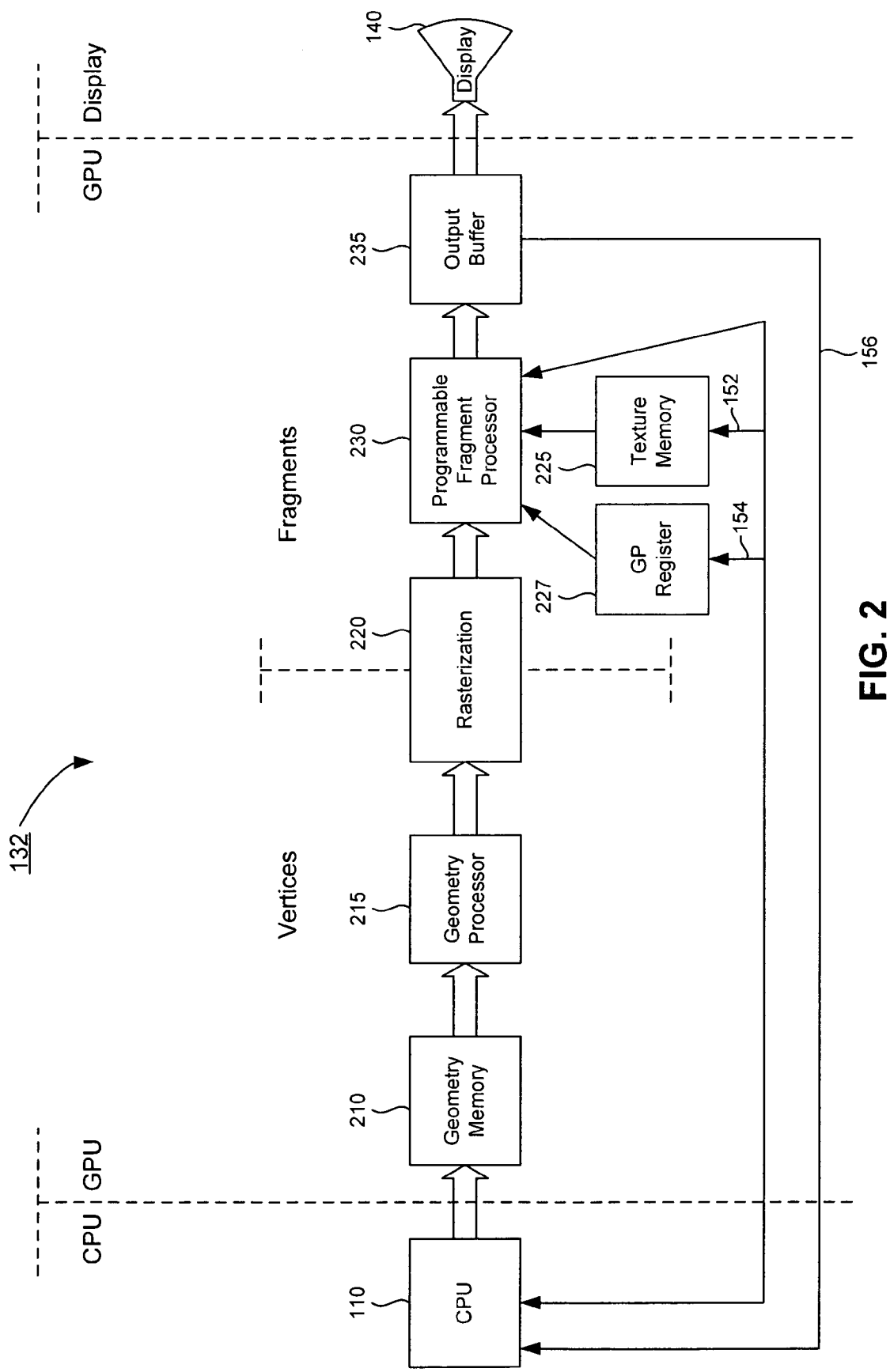
FIG. 2 illustrates a rendering pipeline.

FIG. 2 is a simplified block diagram of rendering pipeline 132. Rendering pipeline 132 comprises a plurality of functional units that work together to convert the vertices that specify an object to be rendered into fragments or pixels. The fragments or pixels may thereafter be stored in a frame buffer just prior to display. In an embodiment, rendering pipeline 132 will comprise functional units including a geometry processor 215, a rasterizer 220, and a programmable fragment processor 230. Additionally, GPU 130 typically has various memory elements including a geometry memory 210, a texture memory 225, one or more general purpose memory registers 227, and an output buffer 235. GPU 130 may optionally contain functional blocks (not shown) to obtain, encode and/or decode primitive data from object database 110.

As described above and shown in FIG. 2, the per-object data 152 is encoded in texture format. If the encoding occurs in the CPU, then the encoded textures would be imported from CPU 120 into texture memory 225. Similarly, the culling parameters 154, which are typically encoded as floating point values, would be imported into the general purpose memory register 227. The culling operation is then carried out by executing a custom fragment program in fragment processor 230. The cull results are typically, but not necessarily, stored in a portion of output buffer 235 that is not displayed, before they are exported back to CPU 120, or used directly by GPU 130. The results of the culling operation may also be rendered into texture memory 225, or to any other renderable memory target.

A typical rendering pipeline is implemented in software by an application program interface (API), and in hardware by a GPU. On the software side, OpenGL, developed by Silicon Graphics, Inc., is a commonly used API. Another API is Microsoft's Direct3D. On the hardware side, typical GPUs include the NVIDIA's GeForce line of GPUs, and ATI's Radeon line of GPUs.

Figure 3:
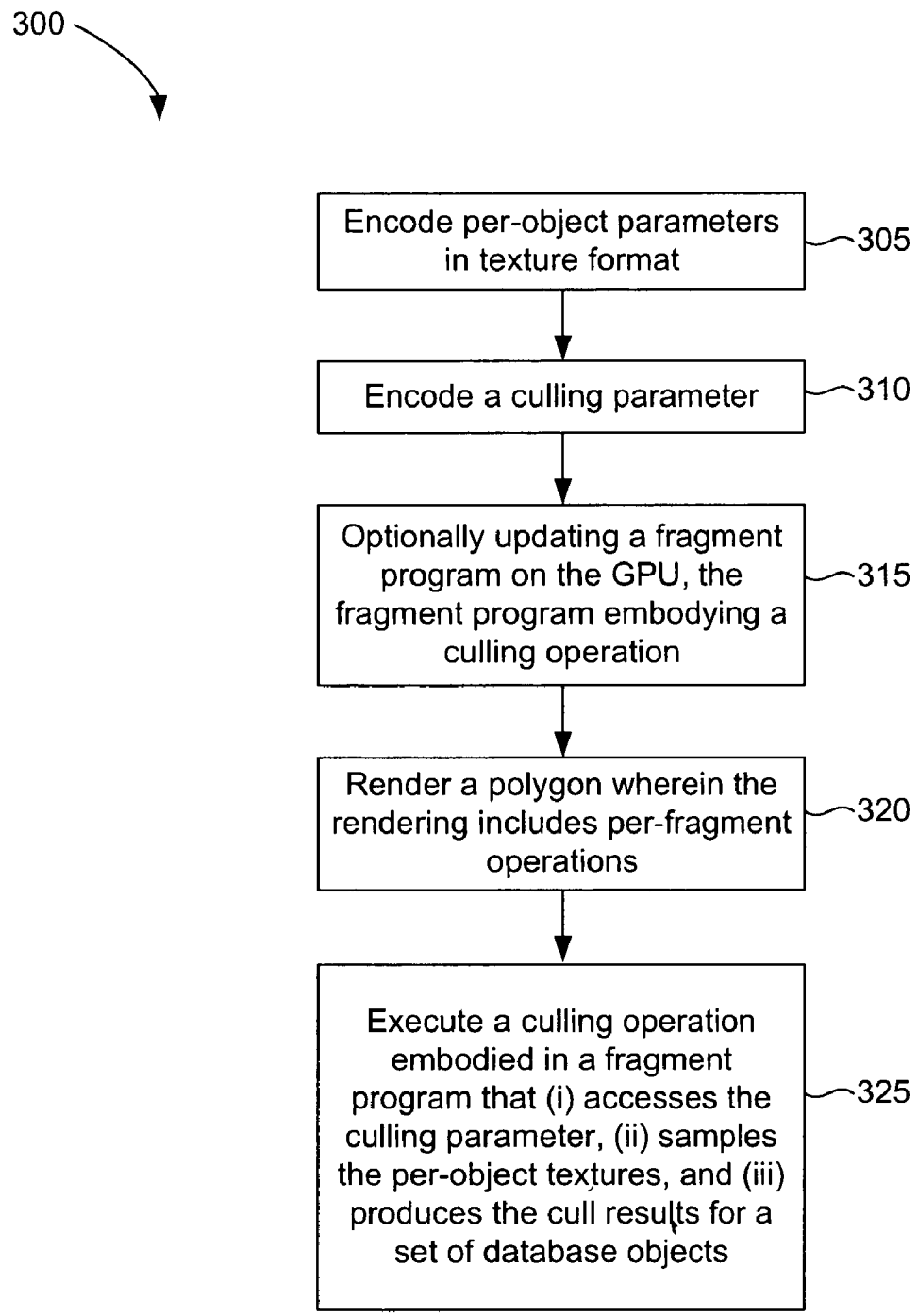
FIG. 3 is a flow chart illustrating a basic method of culling an object database according to an embodiment of the invention.

FIG. 3 is a flowchart describing a method 300, which more specifically describes how the culling operation is implemented by fragment processor 230. According to step 305, per-object parameters 152 are encoded in texture format, thereby creating at least one per-object texture containing the encoded per-object parameters. Typically, one per-object texture may be sufficient. However, the per-object parameter may comprise too many bytes to be encoded as a single texel, or texture element. Thus, the data representing the per-object parameter may be spread across multiple texels within a texture, or, alternatively, across multiple textures.

In an embodiment, a per-object parameter may be a bounding sphere that represents the size and position of an object in the object database. The bounding sphere could also represent a group of objects related by position or possibly a functional parameter (e.g., all the objects making up an automobile). Encoding per-object parameters that represent groups of objects allows hierarchical culling. In an embodiment, a bounding sphere can be encoded in RGBA format by, for example, four floating point values indicating a point (x,y,z) in three-dimensional space, with a radius (r). Each object in object database 110 will typically be associated with at least one per-object parameter, such as a bounding sphere.

According to step 310, a culling parameter 154 is also encoded. The culling parameter(s) 154 will depend on the specific culling operation to be performed. As noted above, culling generally refers to the process of eliminating invisible objects to avoid redundant rendering. Additionally, culling may also refer to reducing processing requirements for visible objects by selecting, for instance, an appropriate level of detail in which to render an object based on the object's distance from the camera or viewpoint.

There are a variety of recognized culling operations, such as view frustum culling, occlusion culling, backface culling, level of detail (LOD) evaluations, and small feature culling. These operations are discussed further below. As a general matter, however, culling parameters for various culling operations can be viewed as global parameters in the sense that they refer to per-frame variables used by the fragment program to produces the cull results for each per-object parameter (e.g., a bounding sphere), and are accessed during each execution of the fragment program that embodies the particular culling operation. For example, one culling parameter could be the current viewpoint, which would change with each frame, but would still act on each object-parameter, with each execution of the fragment program. Culling parameters could also be constant values such as screen size, which typically would not change with each frame, yet would still act on each per-object parameter, and would still be accessed with each execution of the fragment program.

In other embodiments, for example, a culling parameter may be a simple clipping plane. All objects, or groups of objects, on one side of the plane would be visible; those on the other side would be invisible, and therefore culled. In a hierarchical culling approach, a group of objects that straddle the clipping plane may be further evaluated in a second culling pass.

In yet another embodiment, multiple clipping planes are encoded. For example, in view frustum culling, the culling parameters will be a set of six clipping planes representing the sides of a view frustum. Where the culling parameter is a plane, it can be encoded, for example, by four floating point values representing a vector (x,y,z) normal to the plane, having a distance (d) from an origin. As noted above, if the per-object parameters 152 and culling parameters 154 were encoded by CPU 120, then they would be exported to GPU 130.

According to step 315, a fragment program is optionally updated so that it embodies the current culling operation. Fragment processor 230 is typically programmable, and a user can change the fragment program to carry out a variety of per-fragment operations. For each polygon that is rendered, the fragment program may be updated to implement a different culling operation.

According to step 320, a polygon is then rendered in the rendering pipeline. In an embodiment, the polygon being rendered will not ultimately be displayed or viewed. It is merely a vehicle for introducing the texture encoded per-object parameters and encoded culling parameters into the rendering pipeline where they can be used by the fragment program in fragment processor 230. As illustrated in step 320, the rendering process includes per-fragment operations. Step 325 more specifically delineates these per-fragment operations. Specifically, the updated fragment program embodying the culling operation will execute for each fragment passing through the rendering pipeline. For each execution, the updated fragment program accesses the culling parameter stored in general purpose register 227, and samples at least one per-object texture stored in texture memory 225.

In an embodiment, the fragment program samples, or accesses, the texture containing the per-object parameters so that the texture coordinates are different for each processed fragment. By mapping the textures to the fragments in this way, a one-to-one association is established between the objects in the database (e.g., the texture-encoded bounding spheres) and the fragments generated by rendering the polygon. If, on the other hand, the texture were sampled each time using the exact same texture coordinates, then the fragment program would be continually repeating the same cull computations on a single texture-encoded object. In an embodiment, then, the texture-encoded objects are mapped to the fragments so that each object in the database is associated with single fragment. The fragment program will then access the cull parameter, and execute the culling operation on each fragment to produce cull results for a set of database objects.

In an alternative embodiment, multiple textures may be sampled during every execution of the fragment program, or a single texture may be sampled multiple times. As noted above, the per-object parameter may comprise too many bytes to be encoded as a single texel, or texture element. In this case, the data representing the per-object parameter may be spread across multiple texels within a texture, or, alternatively, across multiple textures. To accommodate this scenario, the fragment program would have to either sample the same texture in two different locations, or possibly sample multiple textures to obtain the complete per-object parameter.

Additionally, multiple database objects may be processed by a single execution of the fragment program. In this case, per-object data associated with multiple objects may be stored together in a single texture element. For example, if the per-object data may be represented by two floating point numbers (as opposed to a bounding sphere, which occupies four), then data for two objects could be stored in a single texel.

There are at least two factors that determine the number of different objects for which a cull result can be computed in a single execution of the fragment program. First, the number is determined by how much data is required to store a single cull result. For example, if the cull result is a Boolean value, then only one bit is needed, and cull results for multiple objects could be encoded in a single fragment. In other embodiments, however, a cull result could require more data. For example, level-of-detail switching typically chooses amongst a plurality of detail levels, and more bits would be needed to encode the cull results for a single database object.

The second factor related to the number objects for which a cull result can be computed in a single execution of the fragment program is a function of how much output data each execution of the fragment program can write. That is, while multiple objects may be encoded in one or more textures, the fragment program can only output a finite amount of information for each execution, as limited by the amount of renderable target memory.

After the polygon has been rendered, the final set of fragments are stored in a renderable target memory—e.g., undisplayed portion of output buffer 235 or possibly texture memory 225. This final set of fragments contains the cull results for whichever database objects were accessed by the fragment program during the rendering operation. The final set of fragments 156 may, in one embodiment, be decoded in the CPU so as to obtain the results of the culling operation. By accessing the cull results, the current implementation may skip or reduce further processing for those results. In this fashion, the rendering pipeline of the GPU has been leveraged to conduct culling operations that would normally have been performed by CPU 120.

As noted above, there are a number of different culling operations. Typical culling operations include view frustum culling, occlusion culling, level of detail evaluation, small feature culling, and backface culling. These culling operations are well known to those of skill in the art, and are described only briefly below.

As discussed above, culling may be performed using a single clipping plane. However, one skilled in the art can recognize how additional user provided clipping planes can be added to extend the invention to manage a set of clipping planes, such as a view frustum. A view frustum is a truncated pyramid that represents the projection of a flared rectangle a user would see from a particular viewpoint. A view frustum is thus made up of a set of six planes including a near plane and a far plane, which are parallel to each other, and four planes joining them to make the truncated, four-sided, pyramid. Everything inside the view frustum would be visible, while objects falling outside the view frustum would be thrown out, or culled. For view frustum culling, the per-object parameter is a bounding sphere, while the culling parameter is a set of six planes that make up the view frustum. View frustum culling thus consists of performing sphere/plane intersection calculations to determine whether a particular bounding sphere lies inside the set of planes defining the view frustum or outside the set of planes defining the view frustum. The sphere/plane intersection calculation would be embodied in the custom fragment program. As the view position changes, the culling parameters would be updated accordingly.

Additionally, this invention may be easily adapted to carry out occlusion culling, whereby a number of planes are used to specify a volume that lies completely behind a visible occluder, or set of occluders. This may be accomplished, for example, by projecting the occluder silhouette from the view point. In this case, an object would be culled out if its bounding sphere lies entirely within all the projected planes representing the silhouette, and would be considered visible otherwise. For example, if a large building is in front of the camera or view point, a silhouette of the building can be computed as a convex polygon projected from the viewpoint to infinity representing the volume that is occluded buy the building.

Level of detail (LOD) evaluations are another recognized type of culling operation. LOD evaluations consist generally of selecting amongst different representations of the same object in object database 110. For example, an object could have four different resolutions that can be switched at 10 50 100 and 1000 meters from a selected viewpoint or camera position. Objects closer to the camera position or viewpoint would be rendered at a higher resolution, while objects further away would be rendered at a lower resolution. In one implementation, both per-object bounding spheres and per-object LOD switching distances are encoded as textures. The fragment program evaluates the distance from the viewpoint to the center of the object bounding sphere, and then compares this distance with the specified per-object switching distances. Alternatively, LOD selection may be accomplished using the bounding sphere alone, without the use of per-object switching distances. For example, the screen size of each object may be estimated based on object size as determined by its bounding sphere radius and its distance from the viewpoint. An LOD level may then be selected in this fashion.

Small feature culling is a subset of LOD evaluation, and may be accomplished using essentially the same per object parameters and culling parameters. Small feature culling is the removal of objects that are too small to be seen in an image, or are below some user defined threshold. For instance, an object whose size is only a few pixels big, or is less than a single pixel, would be culled from a particular scene or image.

Backface culling is yet another recognized culling operation. For backface culling, if the object is a single triangle, then the per-object parameter would be its normal vector and its center. If the object consists of a of a plurality of triangles, or portion of one surface of an object, then the per-object parameter would be an average normal vector of the triangles, along with some indication of the amount of angular deviation occurring amongst the set of normal vectors. The culling parameter for backface culling is a view vector. The backface culling is performed by evaluating the angle between the average normal vector of the group of triangles and the view vector. This angle is compared to a predetermined threshold. If this angle is smaller than the threshold (i.e, the vectors are pointing in the same, or nearly the same direction), then the triangles making up the object are backfacing and may be culled out.

As noted above, these culling operations are well known by those of skill in the art and therefore only briefly described. In short, the culling operations typically consist of using the per-object parameters and the culling parameters to determine whether or not the object is visible in a particular frame or image being rendered, or whether certain processing steps may be otherwise simplified. By encoding the per-object data parameters and the culling parameters in a format that is usable by fragment processor 230, GPU 130 may be leveraged to perform culling operations that would ordinarily have been done by CPU 120.

Various embodiments of the present invention have been described above, which are capable of being implemented on an interactive graphics machine. It should be understood that these embodiments have been presented by way of example only, and not limitation. It will be understood by those skilled in the relevant art that various changes in form and details of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A method for using a graphics processing unit (GPU) to cull an object database, comprising:
   (a) encoding per-object parameters in texture format thereby creating at least one per-object texture containing said encoded per-object parameters;
   (b) encoding a culling parameter;
   (c) updating a fragment program on the GPU, said fragment program embodying a culling operation;
   (d) rendering a polygon, wherein said rendering includes per-fragment operations; and
   (e) during said per-fragment operations, executing said updated fragment program, wherein the culling operation embodied therein (i) accesses said culling parameter, (ii) samples said per-object texture, and (iii) produces cull results for a set of database objects,
   whereby said produced cull results will eliminate or reduce further processing of invisible, occluded, or distant objects.

2. The method of claim 1, wherein said per object parameter is a bounding sphere that represents the size and position of an object in the object database.

3. The method of claim 2, wherein said culling parameter is a clip plane.

4. The method of claim 2, wherein said culling parameter is a set of planes representing a view frustum, and said culling operation performs view frustum culling.

5. The method of claim 4, wherein said culling parameter is a set of planes representing an occluded volume, and said culling operation performs occlusion culling.

6. The method of claim 2, wherein said culling parameter is a view position, and said culling operation performs level of detail evaluations.

7. The method of claim 6, wherein additional per-object parameters representing switching distances are encoded in texture format, and said culling operation performs level of detail evaluations.

8. The method of claim 6, wherein said culling operation performs small feature culling.

9. The method of claim 1, wherein said per-object parameter is an average normal vector for a group of primitives, said group of primitives making up part of an object in an object database, and wherein said culling parameter is a view vector, and wherein said culling operation performs backface culling by evaluating the angular difference between said average normal vector for said group of primitives and said view vector.

10. The method of claim 1, wherein said culling parameter is encoded in floating point format.

11. The method of claim 1, wherein said texture is in floating point format.

12. The method of claim 1, wherein step (b) further comprises encoding a plurality of culling parameters.

13. The method of claim 1, wherein step (a) further comprises encoding a plurality of per-object parameters.

14. The method of claim 1, wherein step (a) further comprises creating a plurality of per-object textures.

15. The method of claim 1, wherein step (e)(ii) further comprises sampling texture coordinates such that each fragment program execution obtains one or multiple samples from one or multiple per-object textures to compute cull results for a single database object.

16. The method of claim 1, wherein step (e)(ii) further comprises sampling texture coordinates such that each fragment program execution obtains one or multiple samples from one or multiple per-object textures to compute cull results for multiple database objects.

17. A graphics processing system for culling a geometry database, comprising:
   a per-object parameter encoder that encodes per-object parameters in texture format thereby creating at least one per-object texture containing said encoded per-object parameters;
   a culling parameter encoder that encodes at least one culling parameter; and
   a rendering pipeline for rendering a polygon, said rendering pipeline including a programmable fragment processor, said fragment processor having access to said texture encoded per-object parameters and said encoded culling parameters;
   wherein said fragment processor executes an optionally updated fragment program, said updated fragment program embodying a culling operation that (i) accesses said culling parameter, (ii) samples said per-object texture, and (iii) produces cull results for a set of database objects, whereby said produced cull results will eliminate or reduce further processing of invisible, occluded, or distant objects.

18. The system of claim 17, wherein said per object parameter is a bounding sphere that represents the size and position of an object in the object database.

19. The system of claim 18, wherein said culling parameter is a clip plane.

20. The system of claim 18, wherein said culling parameter is a set of planes representing a view frustum, and said culling operation performs view frustum culling.

21. The system of claim 20, wherein said culling parameter is a set of planes representing an occluded volume, and said culling operation performs occlusion culling.

22. The system of claim 18, wherein said culling parameter is a view position, and said culling operation performs level of detail evaluations.

23. The system of claim 17, wherein additional per-object parameters representing switching distances are encoded in texture format, and said culling operation performs level of detail evaluations.

24. The system of claim 23, wherein said culling operation performs small feature culling.

25. The system of claim 17, wherein said per-object parameter is an average normal vector for a group of primitives, said group of primitives making up part of an object in an object database, and wherein said culling parameter is a view vector, and wherein said culling operation performs backface culling by evaluating the angular difference between said average normal vector for said group of primitives and said view vector.

26. The system of claim 17, wherein said culling parameter is encoded in floating point format.

27. The system of claim 17, wherein said texture is in floating point format.

28. The system of claim 17, wherein texture coordinates are sampled such that each fragment program execution obtains one or multiple samples from one or multiple per-object textures to compute cull results for a single database object.

29. The system of claim 17, wherein texture coordinates are sampled such that each fragment program execution obtains one or multiple samples from one or multiple per-object textures to compute cull results for multiple database objects.

* * * * *